US008566435B1

(12) United States Patent
Kothandapani et al.

(10) Patent No.: US 8,566,435 B1
(45) Date of Patent: Oct. 22, 2013

(54) COMPUTER IMPLEMENTED CONFIGURATION OF A MANAGEMENT MODULE

(75) Inventors: Govind A. Kothandapani, Norcross, GA (US); Rama Rao Bisa, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 428 days.

(21) Appl. No.: 12/686,074

(22) Filed: Jan. 12, 2010

Related U.S. Application Data

(63) Continuation of application No. 10/732,712, filed on Dec. 11, 2003, now abandoned.

(51) Int. Cl.
  *G06F 15/173* (2006.01)
  *G06F 3/00* (2006.01)
(52) U.S. Cl.
  USPC .......................................... 709/223; 715/747
(58) Field of Classification Search
  USPC ................... 709/223, 250; 715/853, 854, 747
  See application file for complete search history.

(56) References Cited

U.S. PATENT DOCUMENTS

| | | | | |
|---|---|---|---|---|
| 5,862,391 A * | 1/1999 | Salas et al. | ..................... | 713/300 |
| 6,040,834 A * | 3/2000 | Jain et al. | ..................... | 715/853 |
| 6,102,965 A * | 8/2000 | Dye et al. | ..................... | 717/109 |
| 6,948,008 B2 * | 9/2005 | Hawkins et al. | ................. | 710/15 |
| 7,051,363 B2 * | 5/2006 | Cheng et al. | ..................... | 726/2 |
| 7,222,313 B2 | 5/2007 | Bullis et al. | | |
| 7,237,086 B1 * | 6/2007 | Kothandapani et al. | .......... | 712/8 |
| 7,337,404 B2 * | 2/2008 | Rollins | ..................... | 715/747 |
| 7,441,021 B1 * | 10/2008 | Perry | ..................... | 709/223 |
| 7,594,037 B1 | 9/2009 | Kothandapani et al. | | |
| 7,673,290 B1 | 3/2010 | Kothandapani et al. | | |
| 2003/0046470 A1 * | 3/2003 | Sivertsen | ..................... | 710/304 |
| 2003/0046471 A1 * | 3/2003 | Sivertsen | ..................... | 710/305 |
| 2003/0046657 A1 * | 3/2003 | White | ..................... | 717/105 |
| 2003/0101021 A1 * | 5/2003 | Shah et al. | ..................... | 702/186 |
| 2003/0110244 A1 * | 6/2003 | Mondal | ..................... | 709/223 |
| 2003/0130969 A1 * | 7/2003 | Hawkins et al. | ................. | 706/15 |
| 2003/0184596 A1 | 10/2003 | Kodosky et al. | | |
| 2004/0177143 A1 * | 9/2004 | Maciel et al. | ................. | 709/224 |
| 2004/0260841 A1 * | 12/2004 | Mathew et al. | ............... | 709/250 |
| 2006/0080636 A1 * | 4/2006 | Hsieh | ..................... | 717/101 |
| 2007/0177143 A1 * | 8/2007 | Chaiken et al. | ............... | 356/326 |

OTHER PUBLICATIONS

RadiSys:CP80 Platform Management Overview and Universal Developer's Guide, published Oct. 2000/Dec. 2000.*

(Continued)

*Primary Examiner* — Firmin Backer
*Assistant Examiner* — Michael A Chambers
(74) *Attorney, Agent, or Firm* — Hope Baldauff, LLC

(57) ABSTRACT

A system and computer-implemented method for configuring a baseboard management controller (BMC) for use in monitoring operation of various computer system components is disclosed. The BMC is communicatively connected to a plurality of components by way of a plurality of slave addresses. Each of the plurality of components sense information related to operating and performance-related parameters associated with various operating conditions inherent in the operation of the computer system. The components provide this sensed information to the BMC, which analyzes the information to determine whether any events are occurring in the computer system. Such an event would be the temperature within the computer system chassis being too hot. Those components communicatively connected to the management module are detected and then identified. Based on these identifications, a configuration file is created and incorporated into the BMC firmware to effectuate the aforementioned configuration process.

20 Claims, 8 Drawing Sheets

(56) References Cited

OTHER PUBLICATIONS

U.S. Notice of Allowance dated Oct. 7, 2009 in U.S. Appl. No. 10/723,712.
U.S. Official Action dated Jul. 15, 2009 in U.S. Appl. No. 10/723,712.
U.S. Official Action dated Dec. 23, 2008 in U.S. Appl. No. 10/723,712.
U.S. Official Action dated Jun. 26, 2008 in U.S. Appl. No. 10/723,712.
U.S. Official Action dated Oct. 5, 2007 in U.S. Appl. No. 10/723,712.
U.S. Official Action dated Dec. 18, 2007 in U.S. Appl. No. 10/723,712.
U.S. Official Action dated Jun. 21, 2006 in U.S. Appl. No. 10/723,623.
U.S. Official Action dated Aug. 28, 2006 in U.S. Appl. No. 10/723,623.
U.S. Notice of Allowance dated Feb. 13, 2007 in U.S. Appl. No. 10/723,623.
U.S. Official Action dated Oct. 27, 2008 in U.S. Appl. No. 11/754,446.
U.S. Notice of Allowance dated May 6, 2009 in U.S. Appl. No. 11/754,446.
U.S. Official Action dated Oct. 15, 2010 in U.S. Appl. No. 12/537,584.
U.S. Notice of Allowance dated Apr. 28, 2011 in U.S. Appl. No. 12/537,584.
RadiSys, "Platform Management—Universal Developer's Guide" Dec. 2000, RadiSys Corporation, pp. i-vi, 1-32.
Super Micro Computer, Inc., IPMI 1.5, Server Management, IPMI View User Guide, 2002. pp. 23.
American Megatrends, Inc. press release "AMI Introduces an Affordable Solution to the Management Needs of Servers and Server Blades", Mar. 18, 2003, 2 pps.
American Megatrends, Inc. Mega News, vol. 4, Issue 4, "MegaRAC-PM: an Affordable System Management Solution", Apr. 2003, 1 pps.
Philips article I$^2$C Bus Solutions, I$^2$C Bus Basics, Jun. 2002, 2 pps.
Philips article "The I$^2$C Business Specification", Version 2.1, Jan. 2000, pp. 1-46.
IPMI Intelligent Platform Management Interface Specification, Version 1.5, Document Revision 1.1, Feb. 20, 2002, 459 pps.
IPMI Intelligent Platform Management Interface Specification Second Generation, Version 2.0, Document Revision 1.0, Feb. 12, 2004, Jul. 12, 2009 Markup, 8 pp. i-iv, 33-34 and 42-43.
Intel article "Intel® Server System SSH4 Board Set", Revision 1.4, Oct. 2003, Intel Order No. C20142-001, pp. 1-180.
U.S. Appl. No. 11/754,446, filed May 29, 2007, "Configuring a Management Module Through a Graphical User Interface for Use in a Computer System", Inventors: Kothandapani et al.
U.S. Appl. No. 12/537,584, filed Aug. 7, 2009, "Configuring a Management Module Through a Graphical User Interface for Use in a Computer System", Inventors: Kothandapani et al.

* cited by examiner

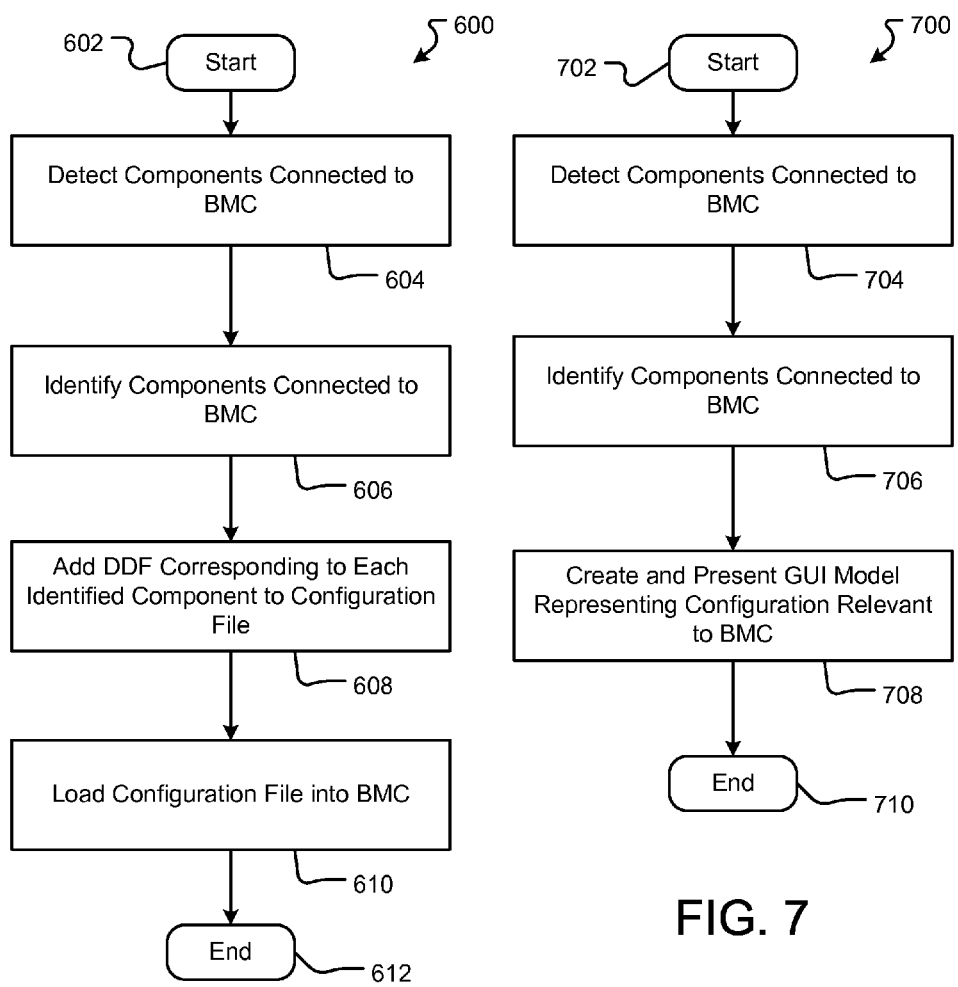

COMPUTER IMPLEMENTED CONFIGURATION OF A MANAGEMENT MODULE

CROSS-REFERENCE TO RELATED APPLICATIONS

This application is a continuation of U.S. patent application Ser. No. 10/732,712, filed Nov. 26, 2003, now U.S. Pat. No. 7,673,290, issued Mar. 2, 2010 which is expressly incorporated herein by reference in its entirety.

U.S. Pat. No. 7,673,290 is related to subject matter disclosed in U.S. Pat. No. 7,237,086, filed Nov. 26, 2003 for CONFIGURING A MANAGEMENT MODULE FOR USE IN A COMPUTER SYSTEM, the subject matter of which is incorporated in this application by reference.

COMPUTER PROGRAM LISTING APPENDIX

A computer program listing appendix was filed in U.S. application Ser. No. 10/732,712 in the form of a compact disc. Exemplary code listings, labeled Code Listing 1 and a Code Listing 2, are recorded on this compact disc and incorporated in this application by reference.

TECHNICAL FIELD

The invention relates generally to computer platform management, and more particularly, to configuring a platform management controller for use in a computer application system.

BACKGROUND OF THE INVENTION

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

The BMC must have knowledge of the types of sensors and devices connected to the contact pins of the BMC in order to correctly ascertain whether any events are occurring in the computer system. The BMC is typically integrated as a component on the baseboard of a computer system, and therefore, it is generally more efficient for baseboard designers to incorporate this knowledge into the BMC during design and manufacturing processes. Unfortunately, the specific layout, i.e., "configuration," of sensors and devices coupled to the contact pins of a BMC dramatically varies from one implementation to another. This variance is commonly based on the preferences of the customers requesting the design/manufacture of the baseboards. As such, it is virtually impossible for designers (also known in the industry as OEMs) to "standardize" the firmware for the BMCs that they are designing and subsequently manufacturing for their customers. For this reason, BMC firmware is typically customized for each configuration requested by separate customers.

The current approach to configuring a BMC for use on a particular baseboard configuration is to manually incorporate into the BMC firmware a software routine containing information identifying the sensors and devices that are specified for that particular configuration. This approach has several drawbacks. First, this approach is extremely time-consuming and requires a significant amount of expertise in firmware/software programming. As such, this current method is not only costly, but also subject to human error. Second, and for similar reasons, updating the firmware of a BMC is a tedious and complicated manual process if, for any reason during the life of the baseboard, the configuration of the baseboard were to change. Thus, the end user of the computer system will most likely not have the expertise to perform the update; rather, the user would most likely have to defer to the assistance of a third party programmer, who undoubtedly will charge dearly for his or her time.

SUMMARY OF THE INVENTION

In accordance with the present invention, the above and other problems are solved by a computer-implemented method for configuring a management module for use in monitoring operations associated with a computer system. To accomplish this, the method detects each component communicatively connected to the management module. These components sense and provide information relating to operations associated with the computer system to the management module. As such, the information may include operating and performance-related parameters representing various operating conditions associated with the computer system. The method further includes identifying the type of information that each component is operable to provide to the management module. For example, one component may be a temperature sensor operable to provide a signal representing a current temperature sensed within the computer system.

The method creates a configuration file that associates each detected component with the type of information that the component may provide to the management module. Once completed, the configuration file is incorporated into the firmware/software of the management module such that the management module is operable to receive each of the identified types of information from the detected components. In an embodiment, the components are communicatively accessible to the management module, i.e., the management module can transmit commands to and receive information from, by way of a slave address. Each component is allocated a slave address; however, each slave address may be assigned to more than one component. In this embodiment, the method detects each of the communicatively accessible components by issuing on all possible slave addresses a discovery request commanding that any connected components respond with an acknowledgement. If an acknowledgement is received from a particular slave address, then a component has been detected on that slave address.

In an embodiment, the configuration method may also be embodied in a system of software/firmware modules, the operation of which interact to create the configuration file for loading into the management module. The system includes a configuration module for detecting components communicatively accessible to the management module and identifying the detected components. The system then creates a configuration file based on the identified components and loads the configuration file into the management module such that the module is enabled to communicate with each of the components.

With reference to both the system and the computer-implemented method, the description files may be used by the present invention to identify each of the detected components. The description files are contained in a description file library and each file specifies information associated with a particular component. In one embodiment, each detected component is identified by analyzing identification information received from the components to each of the description files in order to match the components to a particular file. In another embodiment, each description file includes a routine executable by the management module to create and transmit on each of the plurality of slave addresses an identification request directing that the component corresponding to the file respond with a specific acknowledgement response. Thus, if the component corresponding to that description file is communicatively accessible on the slave address to which the request was sent, the component responds with the specific acknowledgement. Otherwise, the component that had been detected on that slave address does not respond and, after a predetermined period in time for waiting for such a response has lapsed, the routine is executed on another slave address. In either case, the description files identified as corresponding to a detected component are incorporated into the configuration file prior to the file being loaded into the management module.

In accordance with yet another embodiment, the system includes and the method creates a graphical representation of the configuration of components communicatively connected to the management module. The graphical representation is displayed on a display device as a collection of graphical user interface icons. A first icon represents the management module and a plurality of other icons represents the plurality of identified components. Indeed, each of the other icons are selected based on the identification determined for each detected component. The graphical representation also includes the logical connections between each of the plurality of components and the management module.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

Figure 1:
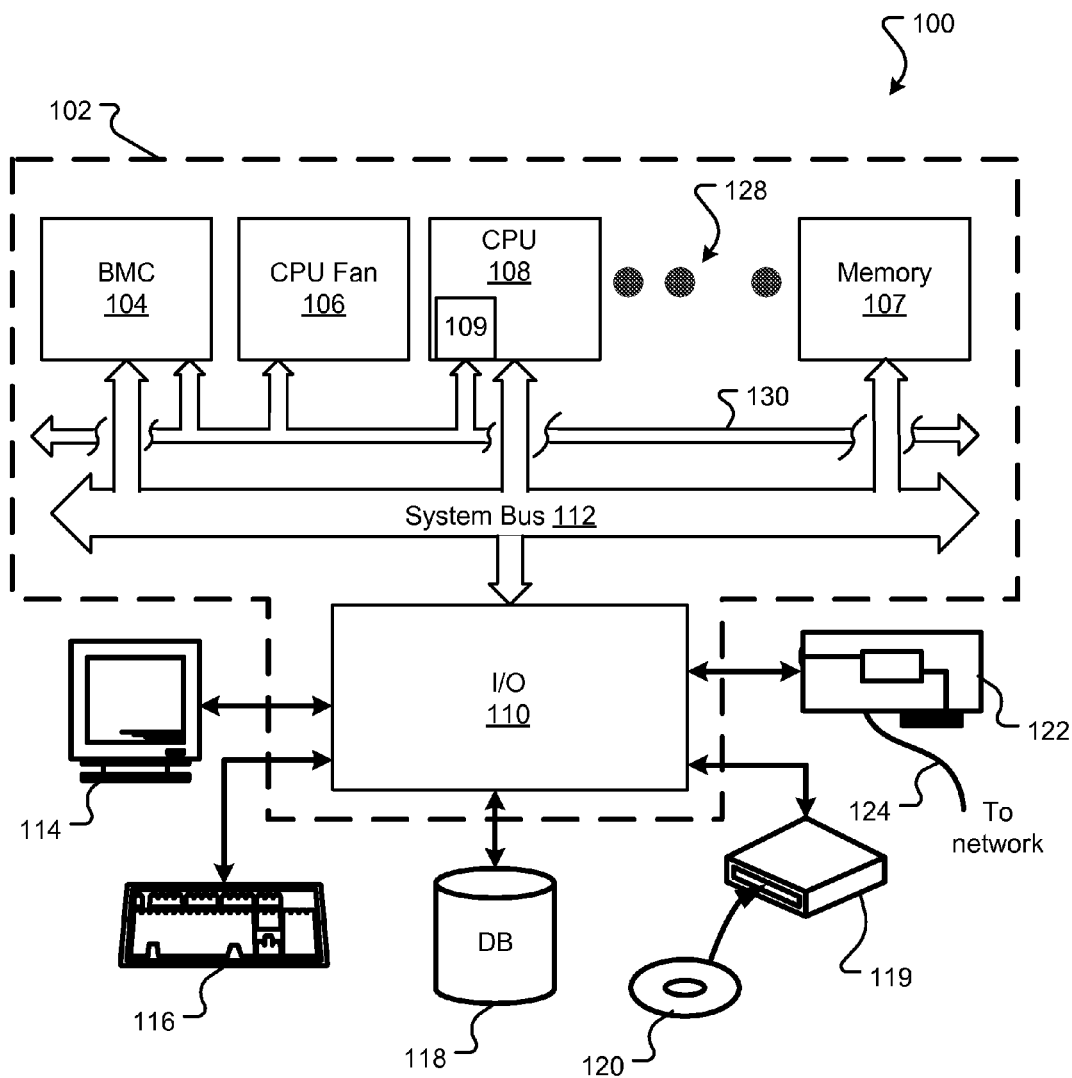

Having thus described the invention in general terms, reference will now be made to the accompanying drawings, which are not necessarily drawn to scale, and wherein:

FIG. 1 depicts a computer system in which a management module monitors and controls operation of various components of the computer system in accordance with an embodiment of the present invention.

Figure 2:
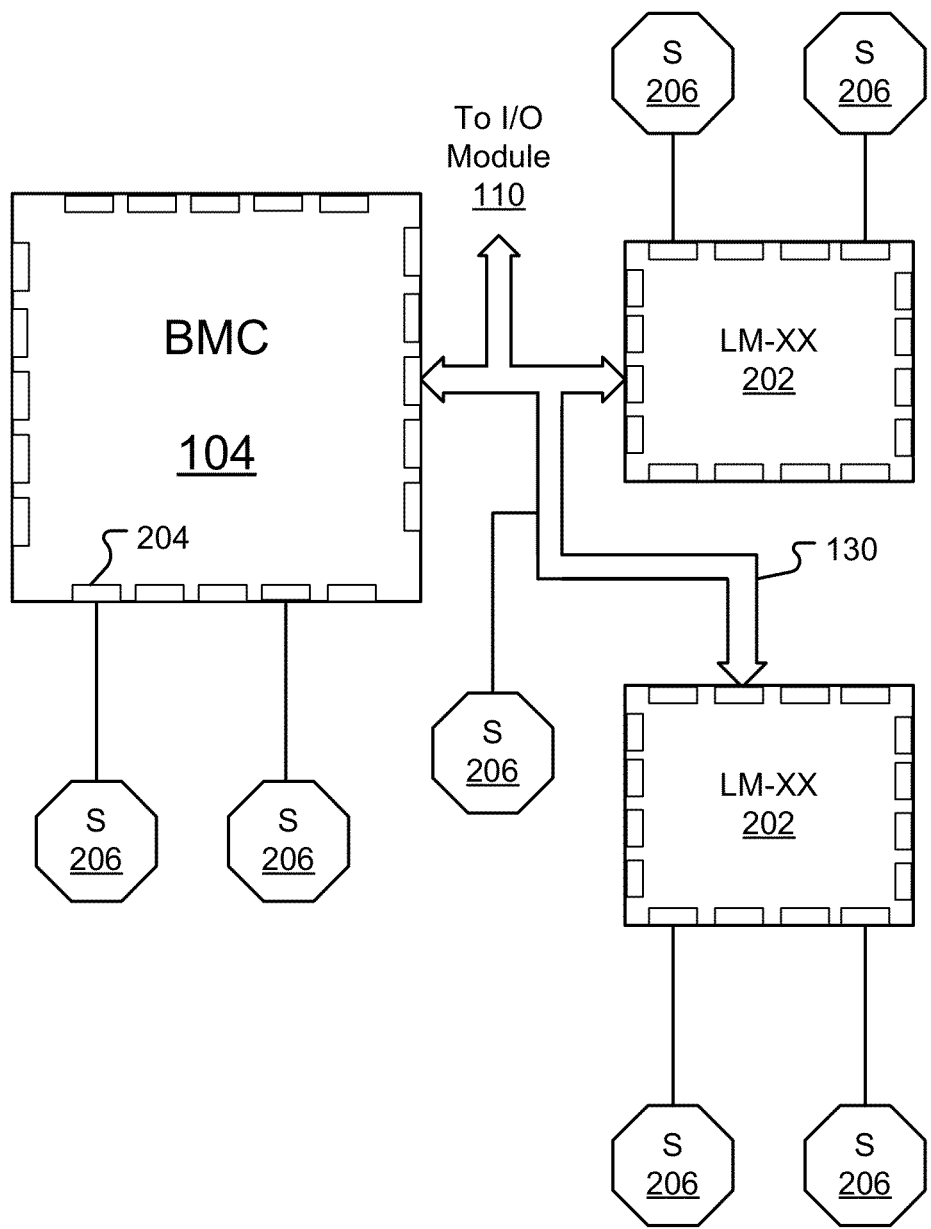

FIG. 2 illustrates a logical configuration of components communicatively connected to the management module of FIG. 1 in accordance with an embodiment of the present invention.

Figure 3:
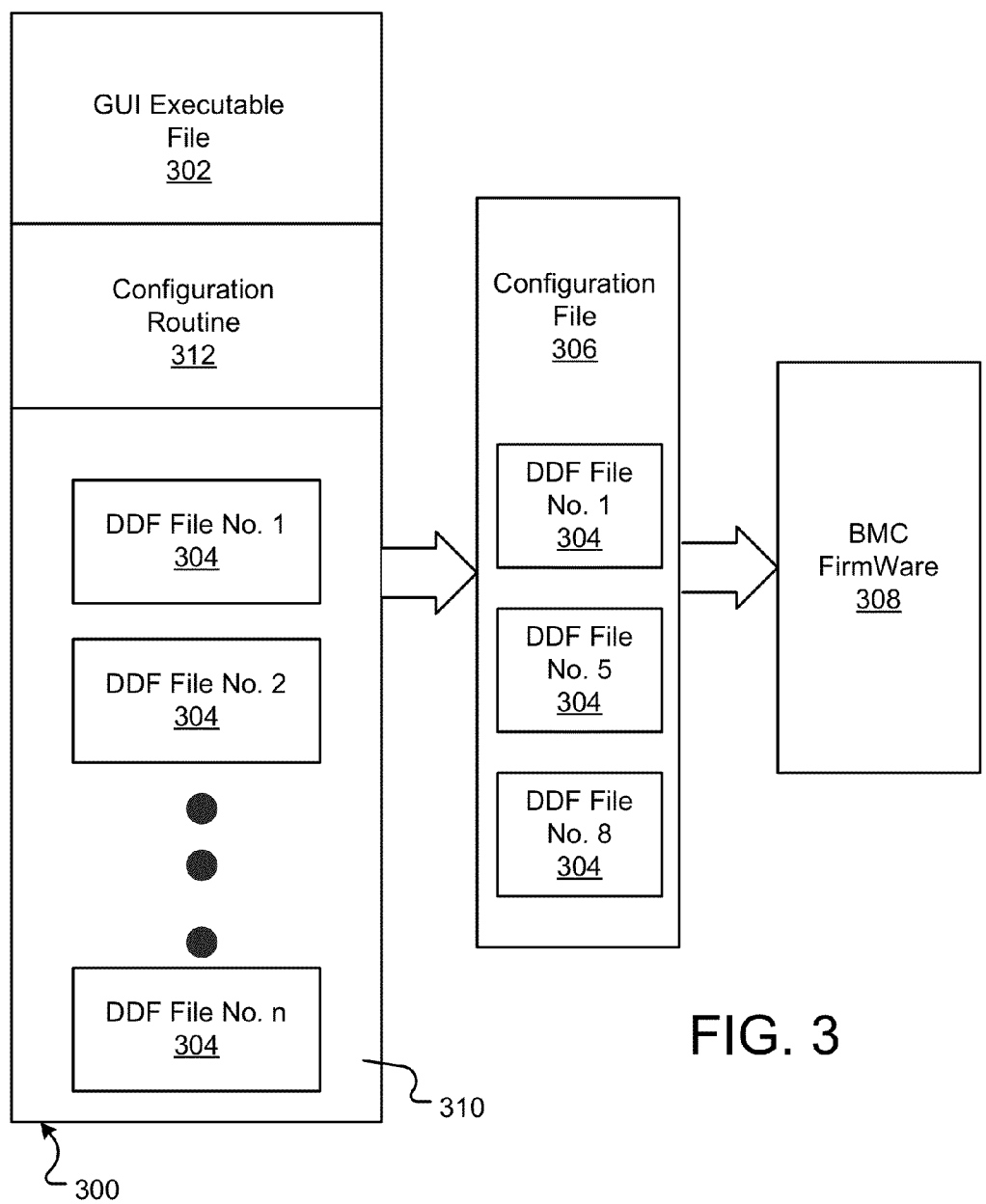

FIG. 3 shows a block diagram illustrating a system for customizing the management module of FIG. 1 for a specific configuration of components included on a computer system baseboard in accordance with an embodiment of the present invention.

Figure 4:
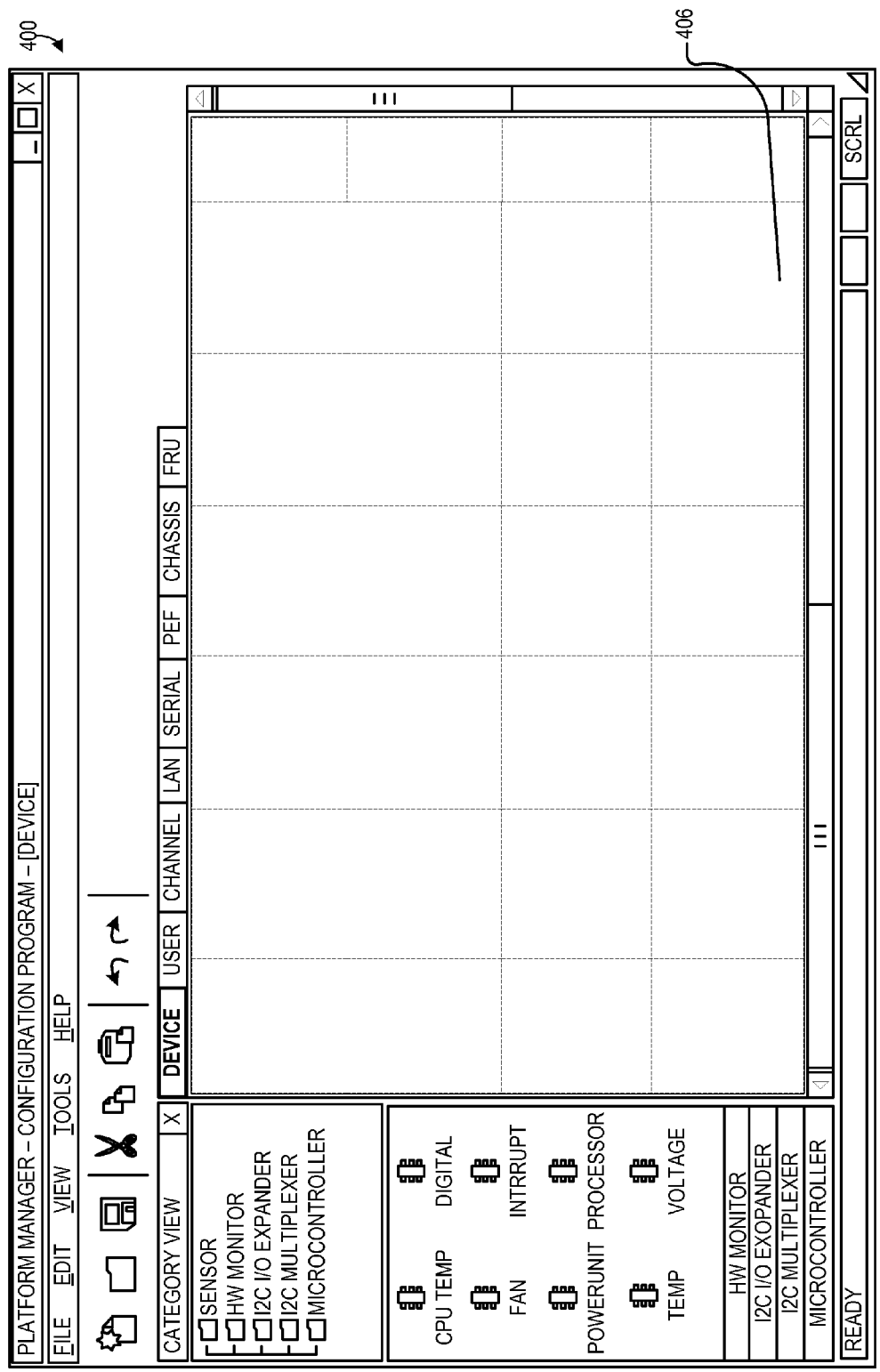

FIG. 4 shows a screenshot of a graphical user interface for modeling a configuration of components communicatively connected to the management module of FIG. 3 in accordance with an embodiment of the present invention.

Figure 5:
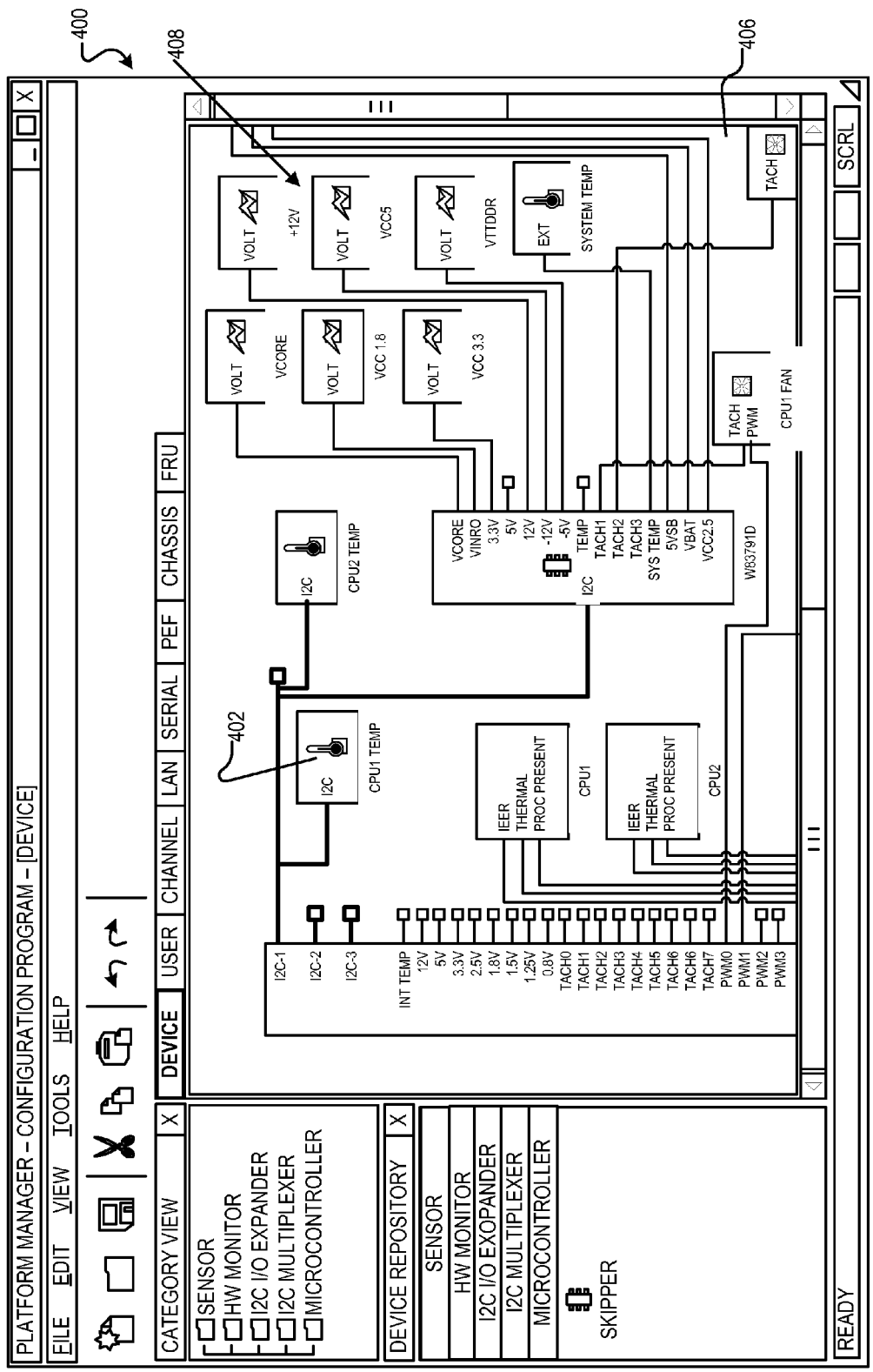

FIG. 5 shows a screenshot of the graphical user interface of FIG. 4 displaying a model representing an exemplary configuration of components communicatively connected to the management module.

FIG. 6 is a flow diagram that illustrates operational characteristics for configuring the management module of FIG. 3 for use in monitoring operations associated with the computer system of FIG. 1 in accordance with an embodiment of the present invention.

FIG. 7 is a flow diagram that illustrates operational characteristics for modeling a configuration of components communicatively connected to the management module of FIG. 3 for use in monitoring operations associated with the computer system of FIG. 1 in accordance with an embodiment of the present invention.

Figure 8:
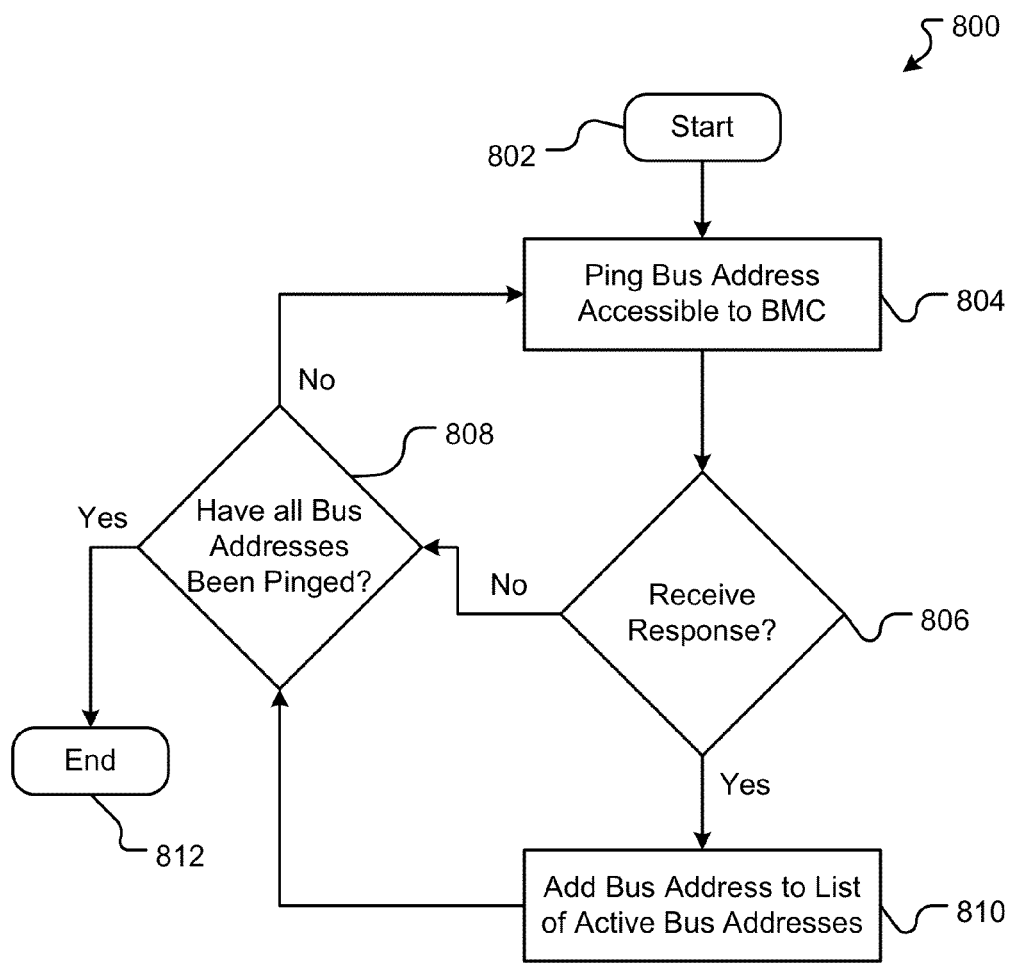

FIG. 8 is a flow diagram that illustrates operational characteristics for detecting components communicatively connected to the management module of FIG. 3 in accordance with embodiments illustrated by the flow diagrams of FIGS. 6 and 7.

Figure 9:
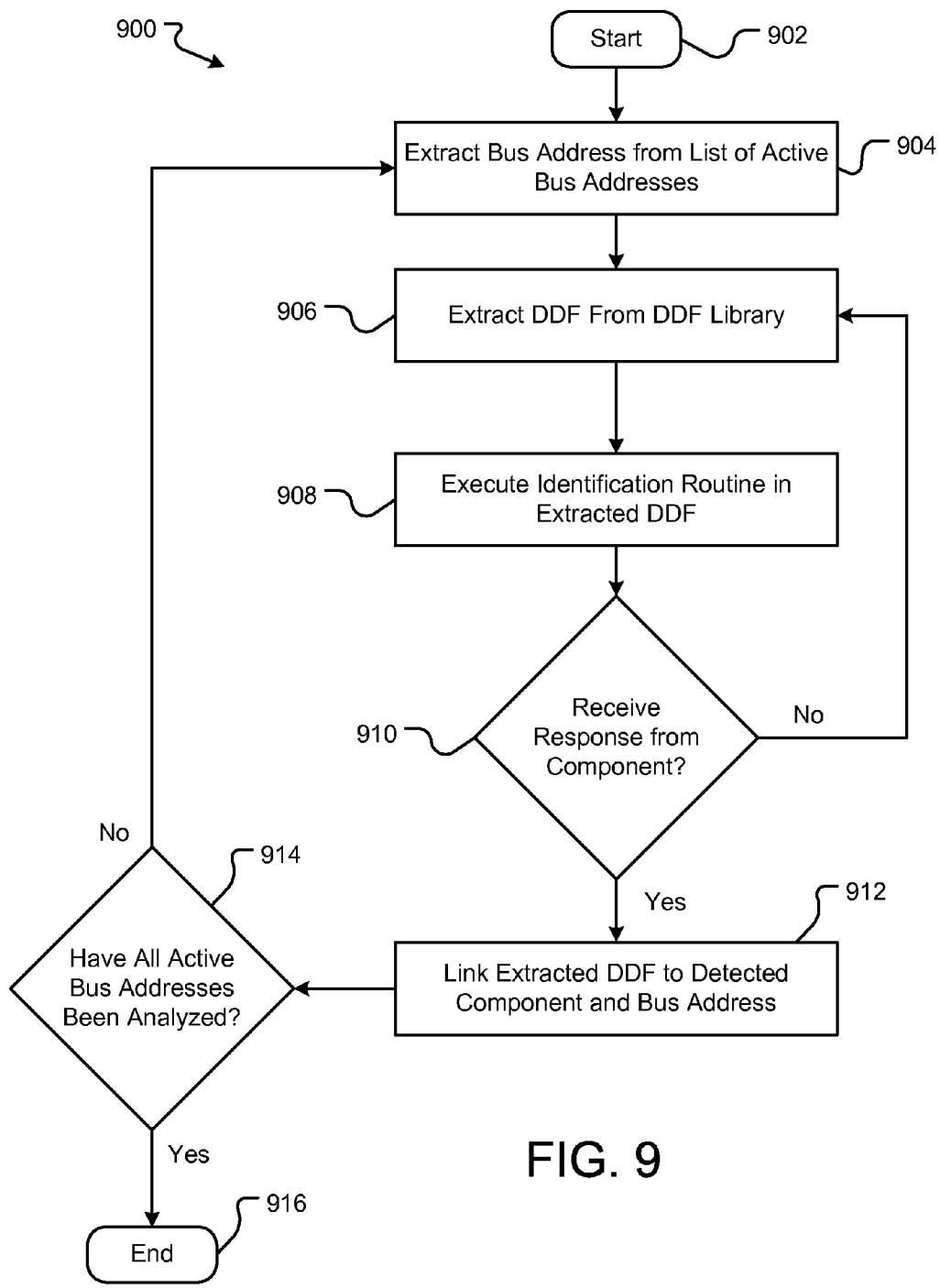

FIG. 9 is a flow diagram that illustrates operational characteristics for identifying components detected as being communicatively connected to the management module of FIG. 3 in accordance with embodiments illustrated by the flow diagrams of FIGS. 6 and 7.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a conceptual illustration of an environment associated with the present invention is shown in accordance with an embodiment of the present invention. FIG. 1 shows a computer system 100, and more specifically a stand-alone, general purpose computer system. It should be appreciated that the computer system 100 may alternatively be a "special purpose" computer system or a system that incorporates more than one interconnected system, such as a client-server network. Indeed, the computer system 100 of FIG. 1 only represents an exemplary embodiment of the present invention, and therefore, should not be considered to limit the invention in any manner.

The central intelligence of the computer system 100 is a baseboard 102, or "motherboard", which is a printed circuit board to which a multitude of components or devices may be connected by way of a system bus 112 or other electrical communication path (not shown). In an embodiment, these components include, without limitation, a baseboard management controller (hereinafter, "BMC") 104, a central processing unit (hereinafter, "CPU") 108, memory 107 and an Input/Output module 110. It is also contemplated that the system bus 112 may include other components that are not explicitly shown in FIG. 1. As such, repetition dots 128 illustrate the possible connection of these other components to the system bus 112. The layout of components, and the manner in which the components are interconnected, on the baseboard 102 is herein referred to as the "configuration" of the baseboard 102.

The system bus 112 provides a two-way communication path for all components connected to the system bus 112. The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus is communicatively accessible to master components, by a particular slave address. Both master components and slave components are operable to transmit and receive communications over the system bus 112. Buses and the associated functionality of master-slave communications are well-known to those skilled in the art, and therefore not discussed in further detail herein.

The CPU 108 is a standard central processor that performs arithmetic and logical operations necessary for the operation of the computer system 100. CPUs are well-known in the art, and therefore not described in further detail herein. Like many electrical components, the CPU 108 dissipates heat while operating. As such, a CPU fan 106 is used to cool off the CPU 108 after the CPU 108 reaches a prescribed temperature. Such a determination, i.e., whether the CPU 108 exceeds a prescribed temperature, is made by the BMC 104, which is communicatively coupled by way of a management bus 130 (described in the following paragraph) to a CPU temperature sensor 109 and the CPU fan 106 to provide monitoring functionality over the temperature sensor 109 and control functionality over the CPU fan 106.

In general, the BMC 104 is a microcontroller that monitors operation of the computer system 100. In a more specific embodiment, the BMC 104 monitors health-related aspects associated with the computer system 100, such as, but not limited to, the temperature of one or more components of the computer system 100, speed of rotational components (e.g., spindle motor, CPU Fan, etc.) within the system, the voltage across or applied to one or more components within the system 100, and the available or used capacity of memory devices within the system 100. To accomplish these monitoring functions, the BMC 104 is communicatively connected to one or more components by way of a management bus 130. In an embodiment, these components include sensor devices for measuring various operating and performance-related parameters within the computer system 100. The sensor devices may be either hardware or software based components configured or programmed to measure or detect one or more of the various operating and performance-related parameters. Like the system bus 112, the component that initiates communication on a bus is referred to as a master and the component to which the communication is sent is referred to as a slave. As such, the BMC 104 functions as the master on the management bus 130 in most circumstances, but may also function as either a master or a slave in other circumstances. Each of the various components communicatively connected to the BMC 104 by way of the management bus 130 is addressed using a slave address.

The management bus 130 is used by the BMC 104 to request and/or receive various operating and performance-related parameters from one or more components, which are also communicatively connected to the management bus 130. In the embodiment of FIG. 1, the management bus 130 communicatively connects the BMC 104 to the CPU temperature sensor 109 and the CPU fan 106, thereby providing a means for the BMC 104 to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. In an embodiment, the management bus 130 is an I$^2$C® bus, which is manufactured by Phillips Semiconductors® and described in detail in the I$^2$C® bus Specification, version 2.1 (January 2000).

The firmware of the BMC 104 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated by reference.

The BMC 104 monitors operating and performance-related parameters received from various components of the computer system 100 in order to determine whether an "event" is occurring within the system 100. In an embodiment, these components may be either directly or indirectly connected to the baseboard 102. For example, with respect to the configuration shown in FIG. 1, the BMC 104 monitors operation of the CPU 108 (by way of the CPU temperature sensor 109) and the CPU fan 106 to determine whether certain operating or performance related parameters exceed or fall below prescribed threshold ranges of operation. An example of such an event may be the temperature reading of heat dissipated by the CPU 108 reaching in excess of 145 degrees Fahrenheit.

In accordance with another embodiment of the invention, the BMC 104 may also control one or more components of the computer system 100 in response to the occurrence of an event. Referring back to the example above, the BMC 104 may initiate operation of the CPU fan 106 upon determining that the temperature dissipated by the CPU 108 has reached 146 degrees Fahrenheit. In addition, it is also contemplated that the BMC 104 may also be connected to and receive sensed information from components connected directly to a contact pin 204 (FIG. 2) of the BMC 104 or indirectly by way of a bus (e.g., system bus 112) other than the management bus 130, as addressed while describing the BMC 104 in greater detail in FIGS. 2-3 in accordance with an embodiment of the invention.

The Input/Output module 110 is used as a communication medium between any number and type of peripheral devices and the system bus 112. Communications destined for the CPU 108, the BMC 104 or any other component coupled to the system bus 112 and issued by a peripheral device must therefore pass through the Input/Output module 110 to the system bus 112 and then to the necessary component. Exemplary peripheral devices are shown in FIG. 1 and described below.

In the embodiment of FIG. 1, the Input/Output module 110 is connected to a user input module 116, e.g., a keyboard, a display unit 114 and one or more program storage devices, such as, without limitation, the disk storage unit 118 and the disk drive unit 119. The user input module 116 is shown as a keyboard, but may also be any other type of apparatus (e.g., joystick, mouse, etc.) for inputting commands into the CPU 108 or the BMC 104. In accordance with one embodiment, the disk drive unit 119 is a CD-ROM driver unit capable of reading the CD-ROM medium 120, which typically contains programs and data.

In accordance with an alternative embodiment, the disk drive unit 119 may be replaced or supplemented by a floppy drive unit, a tape drive unit, or other storage medium drive unit. A network adapter 122 is capable of connecting the computing system 100 to a network of remote computers via a network link 124. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 100. Logical connections may include a local area network (LAN) or a wide area network (WAN). Such networking environments are commonplace in offices, enterprise-wide computer networks, intranets, and the Internet.

In accordance with yet another embodiment, the computing system 100 further comprises an operating system and usually one or more application programs. Such an embodiment is familiar to those of ordinary skill in the art. The operating system comprises a set of programs that control operations of the computing system 100 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system employs a graphical user interface 100 wherein the display output of an application program is presented in a rectangular area on the screen of the display device 114. The operating system is operable to multitask, i.e., execute computing tasks in multiple threads, and thus may be any of the following: Microsoft Corporation's "WINDOWS 95," "WINDOWS CE," "WINDOWS 98," "WINDOWS 2000" or "WINDOWS NT" operating systems, IBM's OS/2 WARP, Apple's MACINTOSH OSX operating system, Linux, UNIX, etc.

Referring now to FIG. 2, an exemplary configuration of sensor devices (e.g., 202, 206) connected to the BMC 104 is shown in accordance with an embodiment of the present invention. The sensor devices (e.g., 202, 206) include various types of sensors 206 as well as sensor aggregation components 202. The sensors 206 measure or sense operating and performance-related parameters associated with the computer system 100. The sensor aggregation components 202 receive this information sensed by the sensors 206 and provide this information to the BMC 104 for analysis, and more particularly, for determination on whether an "event" is occurring within the computer system 100.

The sensor aggregation components 202 are shown in FIG. 2 as LM-XX devices (e.g., LM-78 and LM-85 model logic components), but may be any type of hardware and/or software component capable of receiving sensed information and managing the delivery of this information to the BMC 104. Alternatively, the sensor aggregation components 202 may be operable to not only collect and forward sensed information, but also to analyze the sensed information to render advice on the parameters being monitored by the sensors 206. Even further, the sensor aggregation components 202 may be programmed with firmware operable for performing sensing and measuring functions substantially similar to those functions performed by the sensors 206.

As shown in FIG. 2, sensor devices (e.g., 202 and 206) are connected to, and therefore communicate with, the BMC 104 by way of contact pins 204 located on the BMC 104. The sensor devices (e.g., 202, 206) may be connected to the BMC contact pins 204 either directly or by way of the management bus 130. Regardless of the implementation, the functionality of these sensor devices (e.g., 202, 206) is the same: the sensors 206 sense or measure information and subsequently transmit this information to either the BMC 104 or a sensor aggregation component 202; if to the sensor aggregation component 202, then the information is passed by the sensor aggregation component 202 to the BMC 104. The BMC 104 then analyzes the information sensed by these sensor components (e.g., 202, 206) and either (1) issues an alert that an event is occurring; and/or (2) controls operation of one or more components within the computer system based on the determination that an event is taking place.

While the sensors 206 are described in general terms when describing FIG. 2, it should be appreciated that these sensors 206 may be digital or analog sensors that sense any type of information. For example, the sensors 206 may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 206 may be implemented as a software/firmware routine that senses information related to events associated with operation of either firmware or software modules implemented on the computer system 100. One such sensor 206 may be a software routine for detecting whether a particular software application program is "locked up," and therefore not operating properly.

Referring now to FIG. 3, an illustration of firmware/software modules used for customizing BMC firmware 308 based on components communicatively connected to the BMC 104 is shown in accordance with an embodiment of the present invention. Once customized, the firmware 308 is loaded into the BMC 104 for use in detecting the occurrence of events in an associated computer system (e.g., 100).

The process by which the BMC firmware 308 is customized begins with a software or firmware, i.e., computer-implemented, application 300 specifically programmed to customize the BMC firmware 308 for use with a specific configuration of components. For illustrative purposes, this application program 300 is referred to herein as a "customization program." The customization program 300 may be implemented on the computing system 100 being monitored by the BMC 104, or alternatively, on a remote computer system (not shown) communicatively connected to the computing system 100 on which the BMC 104 resides. To implement such an embodiment, the network adaptor 122 communicatively connects the BMC 104 to the network link 124, which, in turn, provides a communication medium to the remote computer. The network link 124 may be a direct link to the remote computer, or alternatively connect to the remote computer over a network, such as, without limitation, an intranet, the Internet, a local area network (LAN) and/or a wide area network (WAN) connection.

The customization program 300 includes a graphical user interface (GUI) executable file 302, a configuration routine 312 and a DDF library 310 storing a plurality of device description files 304 ("DDFs"). In an embodiment, the DDFs 304 are XML-based software modules that each identify and describe a specific component that may be monitored and/or controlled by the BMC 104. In accordance with another embodiment, the DDF library 310 includes a DDF 304 for any and all components in the industry that may be incorporated onto a baseboard 102. Alternatively, the DDF library 310 may only include a DDF 304 corresponding to only a subset of components known in the industry.

Source code for exemplary DDFs 304 programmed as XML files are provided in a computer program listing appendix recorded on a compact disc submitted concurrently with this application. These program listings are labeled Code Listing 1 and Code Listing 2, and are incorporated into this application by reference. The XML source code for the DDF 304 labeled Code Listing 1 identifies and describes a temperature sensor that may be used to monitor temperature of various components on a baseboard 102 or within a computer system chassis. The XML source code for the DDF 304 labeled Code Listing 2 identifies and describes a voltage sensor that may be used to monitor a voltage being generated or applied across one or more components on a baseboard 102 or within a computer system chassis.

In an embodiment of the present invention, each DDF 304 in the DDF library 310 includes identification information that defines the classification of the component as well as the type of information that the component associated with that DDF 304 will provide. For example, without limitation, the DDF 304 for a temperature sensor includes a definition that the component is of the class "sensor" and of the type "temperature." The following excerpt of source code from the DDF 304 labeled Code Listing 1 illustrates an exemplary definition for this identification information:

```
<Class>Sensor</Class>
<Type>Temperature</Type>
```

In accordance with another embodiment, the DDFs 304 include at least one routine executable by the BMC 104 to receive information from or control operation of the component corresponding with the DDF 304. For example, a DDF 304 corresponding to a temperature sensor may include a routine directing the BMC 104 to send a command to the sensor requesting a reading representing the current temperature sensed by the sensor, and upon reception of the reading, to move the reading to a specific register for subsequent analysis. The following excerpt of source code from the DDF 304 labeled Code Listing 1 illustrates an exemplary executable routine for implementation by the BMC 104:

```
<read>
        mov       r1,2
        oememd
        orb       r1,$(MONITOR_ON_STANDBY)
        cmpeqb    p2, r1,1
```

In accordance with yet another embodiment, the DDFs 304 include at least one identification routine executable by the computer system implementing the customization program 300. These identification routines are used by the customization program 300 to identify whether a component corresponding to the DDF 304 is communicatively connected to the BMC 104. Such a process is described in further detail in connection with FIG. 9. The GUI executable file 302 is executed to render and provide to a user a graphical user interface 400 (GUI) for displaying each component communicatively connected to a contact pin 204 of the BMC 104. The GUI 400 is shown in FIGS. 4 and 5 and includes, among other features, a design page 406 for use in creating and displaying a model 408 based on the configuration of the baseboard 102. In an embodiment of the present invention, the design page 406 also allows users to manipulate, e.g., modify, validate, etc., the model 408. Primarily, though, the model 408 is used in accordance with this embodiment of the invention to display to users a graphical representation of all components communicatively connected to the BMC 104 as well as which components are connected, either directly or indirectly, to which pins 204.

Before these components can be displayed on the GUI 400, they must first be detected. In accordance with an embodiment, the customization program 300 includes a software/firmware routine, or module, operable for detecting all components communicatively connected to the BMC 104. This routine is shown in FIG. 3 as the configuration routine 312. An embodiment of the configuration routine 312 is described in more detail in connection with FIG. 8.

The customization program 300 compiles the DDFs 304 associated with each detected component into a configuration file 306 which will ultimately be loaded into the firmware 308 of the BMC 304. Also, upon detection of a component being communicatively connected to the BMC 104, the customization program 300 updates the model 408 on the design page 406 to indicate the detection of that particular component as well as the pin arrangement of that component to the BMC 104. As such, the completed model 408, which is shown in FIG. 5 in accordance with an exemplary configuration, includes, without limitation, each detected component and the specific connection of each component to the BMC 104. It is contemplated within the scope of the invention that those components that are detected as being communicatively connected to the BMC 104 may be connected either directly or indirectly by way of one or more buses (e.g., the management bus 130) to the BMC 104. However, in an embodiment of the invention illustrated by the screenshot of FIG. 5, the model 408, shown completed, does not distinguish between components connected to the BMC 104 via different busses, but rather depicts which components are connected to which contact pins 204, regardless of whether the connection is direct or indirect.

From the foregoing, it should be understood that the customization program 300 is used to create source code for the configuration file 306 as well as model the configuration of the baseboard relevant to the BMC 104. As such, the initial design page 406 is blank and void of any component icons (e.g. 402). In order to build the source code for this configuration file 306, the configuration routine 312 first detects on which addresses of the management bus 130 a component is directly or indirectly connected. Then, the configuration routine 312 builds a list of addresses on which a component is detected. Next, the configuration routine 312 analyzes each DDF 304 stored in the DDF library 310 to identification information associated with the component accessible on each address. In an embodiment, this analysis is accomplished based on commands sent to the components by the program 300 and subsequent responses sent by the detected components and including the identification information.

After the identity of these components is determined by the configuration routine 312, the customization program 300 adds the DDF 304 corresponding to each identified component to the source code of the configuration file 306 and adds an icon (e.g. 402) of the component to the model 408 being constructed on the design page 406. Finally, after the customization program 300 has detected and identified each component connected to the BMC 104, the source code for the configuration file 306 is compiled and the resulting binary is incorporated into the firmware 308 of the BMC 104. Also, at this time, the model 308 is complete and available for display on the design page 306. The completed model 408 therefore provides a user with a visual representation of each component communicatively connected to the BMC 104 as well as the connections of each component to an associated contact pin 204 of the BMC 104.

The above-described process illustrates customization of BMC firmware 308 for a specific baseboard configuration through the use of a customization program 300. Operation of the customization program 300 is dependent on the timely performance of logical operations implemented on a computer system (such as 100). As such, one of skill in the art will appreciate that these logical operations may be stored on any type of computer readable medium, which may also be referred to as a "computer program product." Exemplary forms of computer readable media include computer storage media and communications media. Computer storage media includes volatile and nonvolatile, removable and non-removable media implemented in any method or technology for storage of information such as computer readable instructions, data structures, program modules or other data. As such, exemplary forms of computer storage media includes, without limitation, read only and random access memory (ROM and RAM, respectively), solid state, non-volatile memory, EEPROM, flash memory or other memory technology, magnetic tape, magnetic cassettes, magnetic disk storage, magnetic disc media or other magnetic storage devices, DVD or other optical storage, and CD-ROM. Communications media includes a modulated data signal, such as, but not limited to, a carrier wave or other transport mechanism, propagating on a carrier. A modulated data signal refers to a signal that encodes information. Exemplary forms of a carrier for communications media include, without limitation, any type of wired network and/or wireless media, such as acoustic, radio frequency, infrared and other wireless media.

It will be appreciated that the acts and symbolically represented operations include the manipulations by a CPU of electrical signals representing data bits causing a transformation or reduction of the electrical signal representation, and the maintenance of data bits at memory locations in memory, solid state, non-volatile memory, CD-ROM or any other type of storage unit (e.g., disc drive, tape drive, etc.) to thereby reconfigure or otherwise alter the operation of the computing system implementing the customization program 300, as well as other processing signals. As such, performance of these operations is referred to as being "computer executed." The memory locations where data bits are maintained are physical locations that have particular electrical, magnetic, or optical properties corresponding to the data bits.

Logical operations of embodiments of the customization program 300 are implemented (1) as a sequence of computer-implemented steps running on a computing system, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. In accordance with one embodiment and referring back to FIG. 1, shown therein is a general-purpose computer that implements such logical operations of this embodiment of the present invention.

With the computing environment in mind, FIG. 6 shows a process 600 for configuring (hereinafter, "configuration process 600") a management module for implementation in a computer system in accordance with an embodiment of the present invention. More specifically, the configuration process 600 is performed using a software or firmware program that may be implemented on either the computer system 100 on which the management module is implemented or a remote computer communicatively connected to the management module over a network connection. In this embodiment, the configuration process 600 shown in FIG. 6 and described below encompasses logical operations of the customization program 300. As described and depicted in FIGS. 1-5, the management module of this embodiment is a BMC 104 implemented on a baseboard 102 of the computer system. The configuration process 600 is implemented using a flow of operations ("operation flow") beginning with a start operation 602 and concluding with a terminate operation 612. The start operation 602 is initiated after the BMC 104 has been communicatively connected to the baseboard 102. In an embodiment, this connection occurs as the BMC 104 is affixed or soldered to the baseboard 102. In another embodiment, this connection occurs as the BMC 104 is coupled to the baseboard 102 by a form of transmission line. As such, in this latter embodiment, the BMC 104 may actually be located on a remote computer, and therefore, coupled to the baseboard 102 by a direct or indirect (i.e., network) communication link. Regardless of the embodiment, the start operation 602 is initiated at a point in time when the BMC 104 is operable to communicate with the various components located on the baseboard 102 and within the chassis of the computer system 100. From the start operation, the operation flow passes directly to a detect operation 604.

The detect operation 604 encompasses a discovery session in which each component communicatively connected to the BMC 104 is detected. The detect operation 604 initiates this discovery session by issuing discovery requests to each slave address accessible to the BMC 104. In an embodiment of the invention, the accessible slave addresses are the addresses of each contact pin 204 as well as the bus addresses on the management bus 130. In another embodiment, other buses (e.g., the system bus 112) may include slave addresses communicatively accessible to the BMC 104. As such, the detect operation 604 may issue discovery requests on these slave addresses as well.

The discovery requests may be issued in any manner, but one specific embodiment is shown in FIG. 8 and described in greater detail below. In this embodiment, the detect operation 604 sequentially pings each accessible slave address, and if no response is received from the last pinged address within a predetermined period in time, the detect operation 604 moves onto the next address and repeats this procedure. In an alternative embodiment, the detect operation 604 floods all accessible slave addresses with a discovery request, and thereafter waits for responses on any of the addresses for a predetermined period in time. Regardless of the embodiment, if a response is received on a particular slave address, then the detect operation 604 records the detection of a component on that slave address. One way in which this recordation may be administered is by logging that slave address to a file that is used to compile a listing of each slave address on which a component is detected. After the log file has been created, the operation flow passes from the detect operation 604 to the identify operation 606.

The identify operation 606 utilizes the log file created by the detect operation 604 to analyze information associated with each detected component in order to identify the associated classification. To accomplish this, the DDFs 304 stored in the DDF library 310 are used by the identify operation 606 to determine which components detected on each slave address correspond to which DDF 304. It is contemplated that more than one component may correspond to a single DDF 304.

More specifically, and in accordance with an embodiment, the identify operation 606 issues a standard identification request to each slave address on which a component was detected. The standard identification request includes one or more command(s) that is/are recognizable to all possible components that may be communicatively connected to a BMC 104 as a request for identification information. As such, in response to receiving an identification request, a detected component responds with the requested identification information. For example, each component that may be communicatively connected to the BMC 104 may include a specific register for use in storing classification and/or type indicia.

In receipt of the standard identification request issued by the identify operation 606, the standard identification request commands each component receiving the request to respond with the value stored in this specific register. The identify operation 606 then analyzes the response from the component against each DDF 304 in the DDF library 310 until a match is found therebetween. The detected component is therefore identified as being the component corresponding to the matched DDF 304. In an embodiment wherein the identification information requested by the standard identification request is class and/or type indicia, the identify operation 606 compares the received class and/or type information (represented by a register value) against the class and/or type specified for each DDF 304 (represented by a predetermined register value) until a match is found.

In another embodiment, the use of standard identification requests may be replaced or supplemented with one or more specific identification requests specified by one or more DDFs 304. In this embodiment, the one or more DDFs 304 each include a specific routine which defines an identification request for use by the identify operation 606 in linking detected component(s) to the DDF(s) 304. Such a process is described in further detail in FIG. 9.

Regardless of the embodiment used to implement the identify operation 606, the operation flow passes to a compile operation 608 after each detected component has been identified by the identify operation 606. Alternatively, the operation flow may pass between the identify operation 606 and the compile operation 608 following the identification of each individual component until all components detected on the slave addresses have been identified. The compile operation 608 incorporates each DDF 304 matched a detected component into the configuration file 306. As such, when completed, the configuration file 306 is a source code listing that includes the DDF 304 corresponding to each identified component. After the configuration file 306 is completed, the operation flow passes to a load operation 610.

The load operation 610 compiles the source code for the configuration file 306 and loads the resulting binary file into the BMC firmware 308. The BMC firmware 308 is therefore customized to include the DDF 304 corresponding to each component that could possibly communicate with the BMC 104 on the computer system 100. As such, the BMC 104 is customized based at least on the configuration of the baseboard 102. From the load operation 610, the operation flow concludes at the terminate operation 610.

Referring now to FIG. 7, a process 700 for modeling a configuration of components communicatively connected to a management module in a computer system is shown in accordance with an embodiment of the present invention. As with the configuration process 600, the modeling process 700 is performed using a software or firmware program that may be implemented on either the computer system on which the management module is implemented or a remote computer communicatively connected to the management module over a network connection. In this embodiment, the modeling process 700 shown in FIG. 7 and described below encompasses logical operations of the customization program 300.

As described in an embodiment of the invention depicted in FIGS. 1-6, the management module is a BMC 104 implemented on a baseboard 102 of the computer system being monitored by the BMC 104. The modeling process 700 is implemented using an operation flow beginning with a start operation 702 and concluding with a terminate operation 710. The modeling process 700 may be performed in conjunction with the configuration process 600, and in fact, shares substantially the same detect (704 and 604, respectively) and identify operations (706 and 606, respectively) described above in connection with FIG. 6. However, these operations are illustrated in FIG. 7 with different numerical references (i.e., 704 instead of 604 and 706 instead of 606) to illustrate the fact that the overall processes (600 and 700), while both including like operations, may be performed independent of the other. The start operation 702, and therefore the monitoring process 700, is initiated at substantially the same point in time as the start operation 602, and therefore the configuration process 600 (i.e., after the BMC 104 has been communicatively connected to the baseboard 102). As such, the different embodiments for detecting such a connection are not described with respect to the modeling process 700, but rather the descriptions detailing the start operation 602 are incorporated as the description of the start operation 702. Likewise, the detect operation 704 and the identify operation 704, which follow the start operation 702, are substantially identical to the detect operation 604 and the identify operation 606. As such, the embodiments of these operations are not repeated for FIG. 7, but rather incorporated as the descriptions for the detect operation 704 and the identify operation 706, respectively.

From the identify operation 706, the operation flow passes to the create operation 708. The create operation 708 constructs on the design page 406 a model 408 representing the components communicatively connected to the BMC 104. In an embodiment, the model 408 is created to include an icon 402 corresponding to each component identified by the identity operation 706. In addition, the create operation 708 constructs the model 408 to include a representation depicting the pin arrangement of each identified component respective to the BMC 104.

The create operation 708 presents the model 408 on the GUI 400, which is being displayed to a user on a display device. In an embodiment, the operation flow passes from the identify operation 706 to the create operation 708 after all components have been identified. As such, the model 408 is constructed and displayed to the user as a completed model. Alternatively, the operation flow may pass between the identify operation 706 and the create operation 708 following the identification of each individual component until all components have been identified. In this embodiment, the user is able to visualize the addition of components to the model 408 as the model 408 is being created. After the completed model 408 is presented on the GUI 400, the operation flow passes and concludes at the terminate operation 710.

FIG. 8 depicts operational characteristics of the detect operations 604 and 704 of the configuration process 600 and the monitoring process 700, respectively, in accordance with an embodiment of the present invention. These operational characteristics are implemented in sequence to effectuate a detection process 800. The detection process 800 is performed using an operation flow beginning with a start operation 802 and ending with a terminate operation 812. The start operation 802 is an embodiment of the start operations 602 and 702, and therefore is initiated as described in connection with FIG. 6 after the BMC 104 has been communicatively connected to the baseboard 102.

Once initiated, the operation flow passes from the start operation 802 to a ping operation 804. The ping operation 804 issues a discovery request to each slave address on the computer system on which a component may be monitored and/or controlled by the BMC 104. In an EMB, slave addresses accessible to the BMC 104 include, but are not limited to, addresses corresponding to contact pins 204 of the BMC 104, addresses on the management bus 130 and addresses on any other bus on which a component that can be controlled and/or monitored by the BMC 104 may be connected. The issuing of a request to ascertain, or discover, the presence of a component on a slave address is referred to as "pinging" the address. The request is a standard command having the functionality of directing a component to respond if a component is indeed communicatively accessible on that address. The ping operation 804 is performed once for each slave address accessible to the BMC 104, and after a request is sent to a slave address, the operation flow passes to a first query operation 806.

Because components may be connected indirectly to the management bus 130 via a sensor aggregation component 202 in accordance with an embodiment of the invention, a slave address may be further partitioned into a plurality of slave addresses. In this embodiment, the sensor aggregation component 202 responds to a discovery request with identification of each of these slave addresses accessible through the sensor aggregation component 202. As such, the response from the sensor aggregation component 202 updates the ping operation 804 with an additional set of slave addresses to ping.

The first query operation 806 monitors the slave address on which a discovery request had just been issued to detect whether a component has responded to the request. In an embodiment, the first query operation 806 only "listens" for a component response for a predetermined period in time. If a response is not received within this predetermined period in time, then the first query operation 806 passes the operation flow directly to a second query operation 808. If, on the other hand, a response has been received on the pinged slave address within the predetermined period in time, the operation flow is passed to a compile operation 810. The compile operation 810 adds that slave address to the log file for subsequent use by the identification operations 606 and 706. As described above, the log file is created by the compile operation 810 to be a listing of all slave addresses on which a component is detected. As such, these slave addresses are referred to as being "active." From the compile operation 810, the operation flow passes to the second query operation 808.

The second query operation 808 determines whether all slave addresses accessible to the BMC 104, either directly or by way of a sensor aggregation device 202 have been pinged by the ping operation 804 If so the operation flow concludes at the terminate operation 812. Otherwise, if all slave addresses have not been pinged by the ping operation 804, the operation flow is passed from the second query operation 808 back to the ping operation 804.

FIG. 9 depicts operational characteristics of the identify operations 606 and 706 of the configuration process 600 and the monitoring process 700, respectively, in accordance with an embodiment of the present invention. These operational characteristics are implemented in sequence to effectuate an identification process 900. The identification process 900 is performed using an operation flow beginning with a start operation 902 and ending with a terminate operation 916. Because the identification process 900 is an embodiment of the identify operations 606 and 706, it follows that the start operation 902 is initiated after completion of the detect operations 604 and 704 of the configuration process 600 and the monitoring process 700, respectively.

From the start operation 902, the operation flow passes to a first extract operation 904. The first extract operation 904 accesses the log file created by the detect operation (either 604 or 704) and selects from the listing of active slave addresses a single slave address. After this slave address is selected, the operation flow passes from the first extract operation 904 to a second extract operation 906. The second extract operation 906 selects a DDF 304 from the DDF library 310, and then passes the operation flow to an execute operation 908. In an embodiment, each DDF 304 in the DDF library 310 includes an identification routine executable by the BMC 104 and defining a specific query for transmission to the various slave addresses communicatively accessible to the BMC 104.

The execute operation 908 executes the query to determine whether the component detected on the extracted slave address type of component corresponding to the extracted DDF 304. Upon execution, the query issues one or more commands to the component detected on the extracted slave address. These command(s) are specific to, and thus, only recognizable to, the component corresponding to the DDF 304, based, for example, on classification and type. As such, upon reception of the command(s), this specific component is caused to respond in such a manner as to be identified on the extracted slave address. In contrast, all other components do not recognize these one or more commands, and thus, do not respond. To that end, the operation flow passes to the first query operation 910 after the execute operation 908 has been performed.

The first query operation 910 is a timed operation that awaits the arrival of a response from the component communicatively accessible on the extracted slave address. This operation 910 is timed in that the operation 910 only waits for such a response for a predetermined period in time. If a response is received within this predetermined period in time, the operation flow passes to a link operation 912. The link operation 912 links the component communicatively accessible on the extracted slave address to the extracted DDF 304, thereby identifying the component as being the component corresponding to the DDF 304. The operation flow then passes from the link operation 912 to a second query operation 914, which is described in further detail below. Otherwise, if a response is not received within this predetermined period in time, the component communicatively accessible on the extracted slave address does not correspond to the DDF 304 and the operation flow passes back to the second extract operation 906, which extracts another DDF 304 for continuation of the analysis described above. This loop is maintained until the component communicatively accessible on the extracted slave address is matched to a DDF 304 from the DDF library 310.

After the component communicatively accessible on the extracted slave address has been identified, the second query operation 914 determines whether the components responding on all active bus addresses listed in the log file have been identified. In the embodiment described, this determination is made by checking on whether all active bus addresses have been extracted by the first extract operation 904. If so, the operation flow concludes at the terminate operation 916. Otherwise, the second query operation 914 passes the operation flow back to the first extract operation 904 and continues as previously described.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, the management module of the present invention is described in accordance with an embodiment as the BMC 104, which encompasses both hardware and firmware features. However, the management module may be readily replaced by any other component, either hardware or software based, or a combination of both, which is operable for monitoring and/or controlling various components of a computer system. Additionally, the customization program 300 is described herein as a system of software or firmware modules being implemented on a computer system, i.e., "computer-implemented;" but, it should also be appreciated that the customization program 300 may be a hardware system constructed of logic devices programmed to perform substantially the same functionality described in connection with FIG. 3. Numerous other changes may be made which will readily suggest themselves to those skilled in the art and which are encompassed in the spirit of the invention disclosed and as defined in the appended claims.

What is claimed is:

1. A computer-implemented method for modeling a configuration of a baseboard of a computer system, the baseboard comprising components communicatively connected to a management module monitoring operations associated with the computer system, the method comprising:
    (a) detecting a presence of a plurality of components included in the configuration of the baseboard, wherein a component classification of the plurality of detected components is unknown;
    (d) defining a plurality of description files, each description file corresponding to a component which may be included within a configuration for the computer system, wherein the plurality of description files each specify a component classification for the component corresponding to each description file, wherein the plurality of description files are configured to be compiled and loaded into a firmware of the management module;
    (b) identifying the component classification for each of the plurality of detected components using the plurality of description files; and
    (c) creating a graphical representation of the configuration of the baseboard, wherein the graphical representation is displayed on a display device as a collection of graphical user interface icons, wherein a first icon represents the management module and a plurality of other icons represent the plurality of detected components, the plurality of other icons being selected based on the component classification identified for each of the plurality of detected components, the graphical representation indicating a corresponding contact pin on the management module to which each of the plurality of detected components is coupled.

2. A method as defined in claim 1, wherein the creating act (c) comprises:
    constructing the graphical representation to display a logical connection between each of the plurality of components and the management module.

3. A method as defined in claim 1, wherein the management module is operable to communicate with the plurality of components by way of a plurality of active slave addresses on a communication medium of the computer system, the plurality of active slave addresses being a subset of a plurality of possible slave addresses communicatively accessible to the management module by way of the communication medium, the detecting act (a) comprising:
    (a)(i) transmitting a discovery request on each of the plurality of possible slave addresses, the discovery request configured to detect the presence of the plurality of components; and
    (a)(ii) responsive to the transmitting act, receiving an acknowledgement response from each of the plurality of components indicating that the plurality of components are communicatively accessible on the plurality of active slave addresses, wherein the component classification of the plurality of detected components is unknown.

4. A method as defined in claim 3, wherein the transmitting act (a)(i) comprises:
    (a)(i)(I) issuing a discovery request on a possible slave address; and
    (a)(i)(II) after a predetermined period in time has passed from which the discovery request was issued on the slave address, repeating the issuing act until each of the plurality of possible slave addresses have been pinged.

5. A method as defined in claim 4, wherein the detecting act (a) further comprises:
    (a)(iii) in response to receiving the acknowledgement responses from each of the plurality of components, adding the active slave addresses from which the acknowledgement responses are received to a log file, wherein the log file, when complete, comprises a listing of each of the plurality of active slave addresses.

6. A method as defined in claim 5, wherein the identifying act (b) comprises:
    (b)(i) traversing the listing in the log file to extract therefrom an active slave address;

(b)(ii) issuing an identification request to the extracted active slave address, wherein the identification request commands one of the plurality of components communicatively accessible on the extracted active slave address to respond with identification information associated therewith; and (b)(iii) in receipt of the requested identification information, analyzing the identification information to identify the component classification for the component communicatively accessible on the extracted slave address.

7. A method as defined in claim 6, wherein the identifying act (b) further comprises: (b)(iv) repeating the traversing (b)(i), issuing (b)(ii) and analyzing (b)(iii) acts until each of the plurality of detected components are identified.

8. A method as defined in claim 7, wherein the analyzing act (b)(iii) comprises:

(b)(iii)(I) evaluating the received identification information against the plurality of description files to determine which of the plurality of description files corresponds to the component communicatively accessible on the extracted slave address; and (b)(iii)(II) linking the extracted slave address to the description file determined to correspond to the component communicatively accessible on the extracted slave address such that the classification of the component is identified based on the linked description file.

9. A method as defined in claim 8, wherein the identification request is a standard request operable for commanding all components which may be communicatively connected to the management module to respond with identification information.

10. A method as defined in claim 8, wherein each of the plurality of description files specify a type of information that may be provided by the component corresponding to each description file, the method further comprising:

creating a configuration file to include each of the description files linked to at least one of the plurality of identified components; and incorporating the configuration file into the management module such that the management module is operable to receive the types of information specified in the included description files.

11. A method as defined in claim 7, wherein each of the plurality of description files comprises an identification routine executable by the management module to create and transmit the identification request to the extracted slave address, wherein the identification request for each of the plurality of description files commands the component corresponding to each description file to respond with a specific acknowledgement that the component is communicatively accessible on the extracted slave address, the issuing act (b)(ii) comprising:

(b)(ii)(I) extracting one of the plurality of description files; and (b)(ii)(II) executing the identification routine specified in the extracted description file such that the identification request is transmitted on the extracted slave address.

12. A method as defined in claim 11, wherein the analyzing act (b)(iii) further comprises:

(b)(iii)(I) if the specific acknowledgement is received from the component communicatively accessible on the extracted slave address within a predetermined period in time, linking the component to the extracted description file; and (b)(iii)(II) if the specific acknowledgement is not received from the component communicatively accessible on the extracted slave address within a predetermined period in time, repeating the issuing act for another one of the plurality of description files until the specific acknowledgement is received from the component communicatively accessible on the extracted slave address.

13. A system for modeling a configuration of a baseboard of a computer system, the baseboard comprising components communicatively connected to a management module monitoring operations associated with the computer system, the system comprising:

a processor;

a memory communicatively coupled to the processor;

a configuration module which executes in the processor from the memory and which, when executed by the processor, causes the processor to detect a presence of components that have an unknown component classification and are communicatively accessible to the management module by way of a communication medium of the computer system and to identify a component classification of each of the components having the unknown component classification using a plurality of description files, each description file corresponding to a component which may be included within a configuration for the computer system, wherein the plurality of description files each specify a component classification for the component corresponding to each description file, wherein the plurality of description files are configured to be compiled and loaded into firmware of the management module, wherein the components provide the management module with operational information relating to operations of the computer system, the management module comprising a baseboard management controller implemented on the baseboard of the computer system; and a graphical user interface module which executes in the processor from the memory and which, when executed by the processor, causes the processor to display on a display device a graphical representation of the management module, each of the components detected, and the component classification of each of the components identified by the configuration module as being communicatively connected to the management module, the graphical representation indicating a corresponding contact pin on the management module to which each of the plurality of detected components is coupled.

14. A system as defined in claim 13, wherein the graphical representation comprises:

a first icon representing the management module;

a plurality of other icons representing the components detected and identified by the configuration module; and graphical representations of logical connections between the components and the management module.

15. A system as defined in claim 14, wherein the management module sends commands to and receives operational information from each accessible component by way of an associated slave address on the communication medium, wherein each slave address associated with an accessible component is an active slave address in set of possible slave addresses on the communication medium.

16. A system as defined in claim 15, wherein the configuration module pings each of the possible slave addresses with a discovery request and subsequently thereafter receives an acknowledgement response from each of the components accessible on the active slave addresses, wherein the acknowledgement responses represent detection by the configuration module of the components.

17. A system as defined in claim 16, wherein the configuration module issues identification requests to the detected components on each of the active slave addresses, the identification requests commanding each of the detected components to respond with identification information associated therewith, and wherein the identification information is analyzed by the configuration module to identify the classification for each of the detected components.

18. A system as defined in claim 17, wherein the classification identified for each of the detected components is used to select each of the plurality of other icons.

19. A computer program product accessible to a computing system and encoding a computer program for executing a computer process for modeling a configuration of a baseboard of a computer system, the baseboard comprising components communicatively connected to a management module monitoring operations associated with the computer system, the computer process comprising:
   (a) detecting a presence of a plurality of components included in the configuration of the baseboard, wherein a component classification of the plurality of detected components is unknown;
   (d) defining a plurality of description files, each description file corresponding to a component which may be included within a configuration for the computer system, wherein the plurality of description files each specify a component classification for the component corresponding to each description file, wherein the plurality of description files are configured to be compiled and loaded into firmware of the management module;
   (b) identifying the component classification for each of the plurality of detected components using the plurality of description files; and
   (c) creating a graphical representation of the configuration of the baseboard, wherein the graphical representation is displayed on a display device as a collection of graphical user interface icons, wherein a first icon represents the management module and a plurality of other icons represent the plurality of detected components, the plurality of other icons being selected based on the component classification identified for each of the plurality of detected components, the graphical representation indicating a corresponding contact pin on the management module to which each of the plurality of detected components is coupled.

20. The method as defined in claim 1, wherein the plurality of components comprise software routines for detecting whether a software application program is operating properly.

* * * * *